3,022,334
PROCESS FOR THE PREPARATION OF
POLYURETHANES
August H. Frazer, Wilmington, Del., assignor to E. I. du Pont de Nemours and Company, Wilmington, Del., a corporation of Delaware
No Drawing. Filed Jan. 14, 1958, Ser. No. 708,768
15 Claims. (Cl. 260—482)

This application is a continuation-in-part of copending application S.N. 556,071, filed December 29, 1955, now Patent No. 2,957,852.

This invention relates to an improved process for the production of difunctional N-alkylated polyurethanes of controlled molecular weight. Difunctionality of a polymer is defined as the capability of a polymer for further polymer-forming reaction by virtue of two reactive groups in the polymer molecule. This characteristic of difunctionality is important when it is desired to use already-formed polymers as intermediates in further polymerization. In such cases, control of the molecular weight of the intermediate polymer is usually necessary.

Methods of forming polyurethanes are well known in the art. Such methods include the reaction of diisocyanates with glycols and the reaction of organic diamines with bischloroformate esters of glycols. Of these only the latter reaction is useful in the formation of N-alkylated polyurethanes. The prior art has taught various conditions for the carrying out of the diamine-bischloroformate reaction. Thus, the reaction may be carried out in solution in organic solvents, or water may be used in a two-phase reaction. The art has taught that either excess diamine or an inorganic base may be used as a binding agent for the hydrogen chloride liberated in the reaction. Frequently, the polyurethanes of the prior art are end products in themselves, that is, they are used as such and are not intended for further chemical reaction. Accordingly, the art has not alleged that such products are difunctional, and in fact, it has been found that polymers prepared by the methods of the prior art are not difunctional.

Furthermore, the polymers of the prior art are almost invariably of high molecular weight. Indeed, Jones and McFarlane, U.S. 2,660,574, state that in a polymerization involving a bischloroformate and a diamine the ratio of the reactants has no effect upon the molecular weight of the polyurethane product. Orthner, Wagner and Schlack, German 912,863, disclose that the degree of condensation can be influenced to a certain extent by selection of the reaction conditions. In general, however, the conditions taught in the prior art do not lead to N-alkylated polyurethanes of sharply defined molecular weight in the range of about 1000–6000.

It is an object of this invention to provide a process for the production of difunctional N-alkylated polyurethanes of molecular weight from about 1000 to about 6000. It is a further object of this invention to provide hydroxyl- or amine-terminated N-alkylated polyurethanes suitable for use as reagents in the formation of linear segmented polymers. Other objects will appear as the description of the invention proceeds.

These and other objects are accomplished by a process for the preparation of difunctional N-alkylated polyurethanes by reacting a bishaloformate with a secondary diamine in an organic solvent free of water and in the presence of an excess of metalliferous base. It is essential that the metalliferous base be present under anhydrous conditions. The process is carried out by merely mixing the ingredients at room temperature in an inert organic solvent with an excess, i.e., more than a stoichiometric amount, of the base to bind the hydrogen halide liberated by the reaction between the bishaloformate and the diamine. The reaction mixture is filtered, and the filtrate is concentrated under vacuum to obtain the polymeric product.

The metalliferous base which serves as hydrogen chloride acceptor may be an alkaline earth or alkali metal oxide, hydroxide or carbonate, such as for example calcium oxide, magnesium oxide, strontium oxide, sodium hydroxide, potassium hydroxide, calcium hydroxide, barium hydroxide, or the corresponding carbonates or bicarbonates. Calcium hydroxide is the preferred base. A 4- or 5-molar excess of calcium hydroxide is sufficient for carrying out the process of this invention.

Suitable organic solvents for the practice of this invention include aromatic hydrocarbons, such as benzene, toluene, and xylene, and chlorinated hydrocarbons such as chlorobenzene. In general, any organic solvent inert to phosgene which is a solvent for the reactants and the polymer is suitable. Benzene is preferred.

The secondary diamines useful as a reagent in the practice of this invention are N,N'-dialkyl-substituted diamines, such that both the nitrogen atoms in the diamine bear one and only one hydrogen. All-aliphatic diamines are preferred. Such diamines are prepared by well known methods, such as for example, by reaction of an alkylene dibromide with a primary amine, by the hydrogenation of a dinitrile in the presence of a primary amine, or by the reduction of Schiff bases prepared from primary diamines and aldehydes.

The bischloroformates used in the practice of this invention are prepared by phosgenating glycols in the usual way. Aliphatic glycols are preferred.

The process of the present invention may be carried out at any temperature from about 0° C. to about 80° C., providing that the reaction medium is liquid and, except for insoluble inorganic bases and/or salts, is homogeneous at the temperature chosen. Room temperature is preferred.

The hydroxyl- or amine-terminated N-alkylated polyurethane formed by the process of this invention may be analyzed in the usual manner for the determination of hydroxyl or amino functional groups. Thus, quantitative acetylation of the polymer is a means of determining the total amino and hydroxyl content of the polymer. Direct titration with acid serves as a measure of the amino groups only, and the hydroxyl content may then be determined by difference. If difunctionality is then established, as described hereinafter, the hydroxyl or amino content leads directly to a value for the molecular weight.

The following examples are given for illustrative purposes only and should not be considered to represent the limits of the invention. It is also to be understood that an excess of diamine or bishaloformate may be used in the examples to obtain amine-terminated or hydroxyl-terminated N-alkylated polyurethanes, respectively. Likewise, any diamine indicated as suitable may be substituted for that indicated in the examples. Unless otherwise indicated, parts are by weight.

EXAMPLE I

To a mixture containing 188 grams of N,N'-diisobutyl-hexamethylenediamine (0.8 mole) and 454 grams of calcium hydroxide (6.0 moles) in two liters of dry benzene is added 166 grams of the bischloroformate of 2,2-dimethyl-1,3-propanediol in one liter of dry benzene with stirring. The mixture is stirred for 8–16 hours and is filtered to remove insoluble calcium hydroxide/calcium chloride. The filtrate is concentrated and the residual viscous liquid heated at 100° C. at less than 1 mm. pressure for 16 hours. The amine-terminated polyurethane product, obtained in 92% yield, is a viscous liquid which contains by analysis 656 amino groups per million grams and no chlorine. These data indicate a molecular weight of 2860.

EXAMPLE II

N,N'-diisobutylhexamethylenediamine (127 grams) and 454 grams of calcium hydroxide are dispersed in two liters of dry benzene. To this dispersion is added a solution of 146 grams of the bischloroformate of 2,2-dimethyl-1,3-propanediol in one liter of dry benzene. The solution is added slowly and the reaction mixture stirred overnight at room temperature. The reaction mixture is filtered, and the benzene removed from the filtrate by distillation. To the residue is added 2.5 liters of acetone, 700 ml. of water, and 35 grams of sodium carbonate, and the mixture is refluxed overnight. Acetone and water are distilled off, a liter of benzene is added, the reaction mixture filtered, and the filtrate concentrated as in Example I. The hydroxyl-terminated polyurethane, obtained in 87% yield, contains by analysis 476 hydroxyl groups per million grams, and no chlorine, corresponding to a molecular weight of 4200.

EXAMPLE III

A mixture of 39.6 grams of N,N'-dimethylhexamethylene diamine and 47.3 grams of N,N'-diethylhexamethylene-diamine are reacted with 143 grams of the bischloroformate of 2,2-dimethyl-1,3-propanediol in the presence of 220 grams of calcium hydroxide and 5000 ml. of dry benzene in a similar manner to that described in Example II above. There is obtained a 93% yield of hydroxyl-terminated N-alkylated polyurethane in the form of a white, viscous liquid. The product analyzes for 530 hydroxyl groups per million grams and 4 amino groups per million grams, corresponding to a molecular weight of 3800.

EXAMPLE IV

A mixture of 27 grams of N,N'-diethylhexamethylenediamine, 40 grams of the bischloroformate of 2,2-dimethyl-1,3-propanediol and 59 grams of calcium hydroxide are reacted in 1000 ml. of benzene in the manner described in Example II. There is obtained an 88% yield of white, viscous liquid containing by analysis 660 hydroxyl groups per million grams and 15 amino groups per million grams, corresponding to a molecular weight of 2950.

With only minor modifications, the procedures given in Examples I and II above are useful for preparing, respectively, amine- and hydroxyl-terminated N-alkylated polyurethanes. In the table below are given a number of such polyurethanes which have been prepared by the process of this invention together with a description of the polymers and their molecular weight. All of these products are water-white, viscous liquids; within a given series, the viscosity increases with molecular weight.

Table
DIFUNCTIONAL N-ALKYLATED POLYURETHANES

| Diamine | Bischloroformate of— | Molecular Weight Range Prepared |
|---|---|---|
| N,N'-Diisobutylhexamethylene diamine. | Ethylene glycol | 2,000 to 3,600. |
| Do | 2,2-Dimethyl-1,3-propanediol. | 1,400 to 4,500. |
| Do | Tetramethylene glycol. | 2,800 to 3,300. |
| Do | Hexamethylene glycol. | 3,000 to 3,800. |
| N,N'-Diethyltrimethylenediamine. | 2,2-Dimethyl-1,3-propanediol. | 3,100. |
| N,N'-Diethyltetramethylenediamine. | do | 3,000. |
| N,N'-Diethylhexamethylenediamine. | Ethylene glycol | 2,100 to 4,400. |
| Do | 2,2-Dimethyl-1,3-propanediol. | 2,500 to 4,000. |
| N,N'-Diethyl/N,N'-dimethylhexamethylenediamine. | do | 2,000 to 4,600. |
| N,N'-Dimethylhexamethylenediamine. | Ethylene glycol | 2,000 to 3,500. |
| Do | 2,2-Dimethyl-1,3-propanediol. | 2,000 to 3,500. |

The above polyurethanes were viscous liquids. The product of the last entry solidified on standing.

An important feature of the present invention is that a process is provided which produces a difunctional N-alkylated polyurethane. Two requirements for difunctionality are that (1) a near-quantitative yield of polymer must be obtained based on the reagent used in the smaller molar amount, and (2) the polyurethane produced must be capable of reacting as a reagent in its own right to form high molecular weight polymer in the standard polymer-producing reactions. The definitive test for the difunctionality of the polyurethanes of the present invention is the further preparation of polymers therefrom. All of the products in the above table proved to be difunctional by this test.

The difunctional N-alkylated polyurethanes made in accordance with the present invention are particularly useful as intermediates in the preparation of high molecular weight segmented polymers which may be spun into elastic fibers. The elastic fibers made from such N-alkylated polyurethanes are outstanding in their improved stability to ultraviolet light.

In the examples below, the property "initial modulus" is determined by measuring the initial slope of the stress-strain curve. "Tensile recovery" is the percentage return to the original length within one minute after the tension has been released from a sample which has been elongated 50% at the rate of 100% per minute and held at 50% elongation for one minute. "Stress decay" is the percent loss in stress in a yarn one minute after it has been elongated to 50% at the rate of 100% per minute.

EXAMPLE V

The N-alkylated hydroxyl-terminated polyurethane (21.0 grams) obtained in Example II is mixed with 2.5 grams of 4,4'-methylenedi-p-phenyl diisocyanate and heated for 2 hours at 85° C. The reaction mixture is dissolved in 75 ml. of N,N'-dimethylformamide, and to this solution is added a solution of 0.25 gram of hydrazine hydrate in 25 ml. of dimethylformamide. The reaction mixture is stirred for 15 minutes, and the viscous solution is cast to yield a clear, tough, elastic film with the following properties: tenacity, 0.42 gram per denier; elongation, 600%; initial modulus, 0.08 g.p.d.; stress decay, 13%; tensile recovery, 94%.

EXAMPLE VI

A benzene solution containing 19 grams of the hydroxyl-terminated polyurethane of Example III and 5.5 grams of terephthaloyl chloride is heated under nitrogen for 16 hours at 40° C. The benzene is removed, and the residue is taken up in 250 ml. of chloroform. To this solution 8.0 grams of 2,5-dimethylpiperazine is added with stirring to yield a homogeneous, segmented polyamide-polyurethane, consisting of about 75 mole percent polyurethane. Homogeneity is evidenced by the fact that less than about 3% of this polymer is extractable in 16 hours using acetone. Fibers spun from the above segmented polymer have the following properties: tenacity, 0.48 g.p.d.; elongation, 800%; initial modulus, 0.03 g.p.d.; tensile recovery, 95%; stress decay, 5.2%.

EXAMPLE VII

The hydroxyl-terminated polyurethane of Example IV (30 grams) is reacted with stirring with 5 grams of 4,4'-methylenedi-p-phenyl diisocyanate at 85° C. for 1 hour. An additional 8.33 grams of the diisocyanate is added, the solution is cooled to 0° C., and there is slowly added a solution of 5.03 grams of 2,5-dimethylpiperazine in 15 ml. of dimethylformamide. The mixture is stirred for about 15 minutes and is then dry spun in the usual manner to yield elastic fibers with the following properties: tenacity, 0.5 g.p.d.; elongation, 680%; initial modulus, 0.2 g.p.d.; tensile recovery, 95%; stress decay, 8%.

Examples in which the methods of the prior art are used in attempts to prepare difunctional N-alkylated polyurethanes are given below. Example VIII describes the use of an organic amine as an acid acceptor when an organic solvent is used.

EXAMPLE VIII

N,N'-diisobutylhexamethylenediamine (26.6 grams) and 23 grams of the bischloroformate of 2,2-dimethyl-1,3-propanediol is reacted in 400 ml. of benzene in the presence of 30 grams of triethylamine at room temperature. The reaction mixture is poured into water, and the benzene and triethylamine are removed by distillation. The organic layer is separated and dried at 100° C. at 1 mm. pressure overnight. There is obtained a 37% yield of polymer containing by analysis 730 amino groups per million grams and over 300 chlorines per million grams of which over half are non-hydrolyzable. This latter type of chlorine is non-reactive and results in a substantial decrease in difunctionality. The product is a highly discolored, watery liquid of low molecular weight. Segmented polymers spinnable into fibers cannot be made from this product.

Example IX describes the use of an alkali metal carbonate in a benzene-water two-phase system. Generally, in such reactions it is found that large excesses of reactants are necessary to obtain products in the 1000–5000 molecular weight range; and in those cases in which low molecular weight products are obtained, the results are not reproducible.

EXAMPLE IX

A mixture of 10 grams of sodium carbonate and 9.1 grams of N,N'-diisobutylhexamethylenediamine in 50 grams of water is added to 6.7 grams of the bischloroformate of 2,2-dimethyl-1,3-propanediol in 250 ml. of benzene. The reaction is carried out under high speed stirring in a Waring Blendor. The reaction mixture is poured into water, benzene is removed by evaporation, and the organic layer is separated and dried. There is obtained an 80% yield of product containing 200 amino groups per million grams, 20 hydroxyl groups per million grams, and 31 chlorines per million grams. The product in further polymer-forming reactions yields products having a broad range of molecular weight and a non-uniform extractability by benzene, showing substantial inhomogeneity and loss of difunctionality.

A particular advantage of this process is that molecular weight control is easily attained by the use of the proper amounts of the reactants in the manner well known to those skilled in the polymer art. To produce an amine-terminated N-alkylated polyurethane, one uses an excess of diamine. To produce a hydroxyl-terminated polymer, one uses an excess of bischloroformate and then subjects the chloroformate-terminated polymer so obtained to a mild basic hydrolysis (sodium carbonate in acetone-water). In this latter hydrolysis, it is necessary to adjust the ratio and amount of acetone-water so that the polymer remains in solution throughout the reaction.

While the invention has been illustrated by the preparation of certain bischloroformates in the examples and table, it is to be understood that any bishaloformate of the diols, such as the bisbromoformate, bisiodoformate, or bisfluoroformate may be substituted for the bischloroformate in the examples or in the table with comparable results. The bischloroformate, however, is preferred. Likewise, any aromatic, aliphatic, or cycloaliphatic diol may be used to prepare the bishaloformate. Polyether glycols or hydroxyl-terminated polymers may also be substituted for the diols given in the examples or in the table although the molecular weight of any hydroxyl-terminated polymer should be relatively low; that is, less than about 3,000. The only limitation placed on the diol is that it must not interfere with the subsequent polymerization of the bishaloformate intermediate.

The intermediates of the present invention may be used to make polymers which are useful for making elastic filaments, fabrics prepared from such filaments, films, and the like. Such products have the same utility as corresponding and similar products disclosed in the parent application Ser. No. 556,071.

It will be apparent that many widely different embodiments of this invention may be made without departing from the spirit and scope thereof, and therefore it is not intended to be limited except as indicated in the appended claims.

I claim:

1. In a process for preparing polyurethanes by reacting an organic diamine with a bishaloformate wherein hydrogen halide is liberated, the improvement which comprises providing N-alkylated polyurethanes of uniform difunctionality by reacting an N,N'-dialkyl-substituted diamine in which the nitrogens bear only one hydrogen atom with a bishaloformate of an organic diol in the presence of an inorganic metalliferous hydrogen halide acceptor, said reaction being carried out by mixing under anhydrous conditions said halide acceptor with said diamine and said bishaloformate in an inert organic solvent for said diamine and said bishaloformate, said halide acceptor being present in an amount in excess of the stoichiometric amount necessary to bind the hydrogen halide liberated by said reaction.

2. The process of claim 1 in which the bishaloformate is a bischloroformate.

3. The process of claim 1 in which the hydrogen halide acceptor is an inorganic base.

4. The process of claim 1 in which the hydrogen halide acceptor is selected from the class consisting of alkaline salts, hydroxides, and oxides of alkali and alkaline earth metals.

5. The process of claim 4 in which the hydrogen halide acceptor is calcium hydroxide.

6. The process of claim 5 in which a 4 to 5 molar excess of calcium hydroxide is present.

7. The process of claim 1 in which the organic solvent is a volatile aromatic hydrocarbon.

8. The process of claim 7 in which the solvent is benzene.

9. The process of claim 1 in which the diamine is entirely aliphatic.

10. The process of claim 9 in which the diamine is N,N'-diisobutylhexamethylenediamine.

11. The process of claim 9 in which the diamine is N,N'-dimethylhexamethylenediamine.

12. The process of claim 1 in which the bishaloformate is the bishaloformate of an aliphatic glycol.

13. The process of claim 2 in which the bishaloformate is the bischloroformate of 2,2-dimethyl-1,3-propanediol.

14. The process of claim 1 in which the reaction is carried out at a temperature between 0° C. and about 80° C.

15. The process of claim 14 in which the reaction is carried out at room temperature.

References Cited in the file of this patent

UNITED STATES PATENTS

| | | |
|---|---|---|
| 2,957,852 | Frankenberg | Oct. 25, 1959 |
| 2,929,802 | Katz | Mar. 22, 1960 |

FOREIGN PATENTS

| | | |
|---|---|---|
| 519,919 | Canada | Dec. 27, 1955 |
| 892,361 | France | Jan. 7, 1944 |